(12) United States Patent
Hagny (10) Patent No.: US 8,978,564 B2
(45) Date of Patent: Mar. 17, 2015

(54) SEED TUBE GUARD WITH INTEGRAL FLUID CHANNEL FOR AGRICULTURAL PLANTERS

(71) Applicant: Matthew P. Hagny, Bel Aire, KS (US)

(72) Inventor: Matthew P. Hagny, Bel Aire, KS (US)

(*) Notice: Subject to any disclaimer, the term of this patent is extended or adjusted under 35 U.S.C. 154(b) by 95 days.

(21) Appl. No.: 13/711,895

(22) Filed: Dec. 12, 2012

(65) Prior Publication Data
US 2014/0158031 A1 Jun. 12, 2014

(51) Int. Cl.
A01C 7/20 (2006.01)
A01C 23/02 (2006.01)
A01C 5/06 (2006.01)
A01C 7/06 (2006.01)

(52) U.S. Cl.
CPC .............. *A01C 23/023* (2013.01); *A01C 5/06* (2013.01); *A01C 7/06* (2013.01)
USPC ........... 111/164; 111/167; 111/174; 111/187; 111/188

(58) Field of Classification Search
CPC ........... A01C 23/023; A01C 5/06; A01C 7/06
USPC ......... 111/118–129, 149, 157–170, 174–176, 111/186–189
See application file for complete search history.

(56) References Cited

U.S. PATENT DOCUMENTS

| 4,132,181 | A | * | 1/1979 | Smith et al. ................... 111/123 |
| 5,664,507 | A | | 9/1997 | Bergland et al. |
| 7,096,805 | B1 | | 8/2006 | Wiesenburger |
| 7,131,384 | B2 | | 11/2006 | Kester |
| 7,140,401 | B2 | * | 11/2006 | Wilcox et al. ..................... 141/2 |
| 7,263,937 | B2 | | 9/2007 | Frasier |

OTHER PUBLICATIONS

White Planter Model 6000, Seed tube guard photographs, 1996.
Kinze 3000 Series Planter, Row Unit Parts Diagram, www.binkleyhurst.com, 2012.
White 6000 Series Planter, Row Unit Parts Diagram, www.agcopartsbooks.com, 2012.

* cited by examiner

*Primary Examiner* — Christopher J Novosad
(74) *Attorney, Agent, or Firm* — Jeffrey L. Thompson; Thompson & Thompson, P.A.

(57) ABSTRACT

A seed tube guard for agricultural planters is cast from a high-chrome cast-iron alloy or manufactured from other wear-resistant material. The seed tube guard has right and left wear surfaces for engaging inner surfaces of a pair of opener discs. A fluid delivery channel is integrated within the body of the seed tube guard with an exit in the bottom surface for delivering fluid into a seed furrow ahead of a seed tube.

22 Claims, 8 Drawing Sheets

SEED TUBE GUARD WITH INTEGRAL FLUID CHANNEL FOR AGRICULTURAL PLANTERS

BACKGROUND OF THE INVENTION

1. Field of the Invention

The present invention relates generally to agricultural planters. In particular, the present invention relates to seed tube guards having a long wear life and an internal fluid channel for applying liquid into the bottom of the seed furrow.

2. Description of the Related Art

Conventional agricultural row crop planters have a plurality of planting row units attached to a transverse toolbar by a parallel linkage. Each row unit has a subframe to which is mounted a furrow opener for forming a seed planting furrow, depth control wheels for controlling the operating depth of the furrow opener, a seed meter for singulating and directing seed through a seed tube into the furrow, and a furrow closing assembly that follows behind the seed tube and furrow opener to close the furrow and thereby cover the seed with soil. A common type of furrow opener is a double disc assembly in which two opener discs contact each other at a leading edge and diverge at a small angle to form the seed planting furrow. The depth of the furrow is determined by the adjustable position of the depth control wheels.

A seed tube guard comprising a metal member is typically positioned in front of the seed tube between the double opener discs. A seed tube guide keeps the seed tube centered on the seed tube guard to prevent the seed tube from being displaced laterally and wearing against the rotating opener discs. Conventional seed tube guards are disclosed in U.S. Pat. Nos. 5,664,507 and 7,263,937.

During operation, ground pressure causes the opener discs to deflect inward until they contact the wear surfaces of the seed tube guard. The seed tube guard functions to protect the seed tube by maintaining a distance between the opener discs.

The seed tube guard also helps create a more effective seed furrow by maintaining a proper distance between the opener discs.

It is generally known that most seed tube guards supplied as original equipment have a short wear life. This is due primarily to the inadequate wear resistance of the material and also the small wear surface.

A seed tube guard assembly with floating hardened wear plates is disclosed in U.S. Pat. No. 7,131,384.

A seed tube guard with liquid capability is described in U.S. Pat. No. 7,096,805. The liquid capability is provided by a stainless steel tube welded onto the leading surface of an OEM seed guard, which is made of a mild cast material. The liquid placement with this prior art seed tube guard has been found to reduce splatter inside the opener blades, but the seed tube guard itself still suffers from the problem that it wears too quickly.

A need still exists in the industry for an improved seed tube guard that is inexpensive to manufacture, provides a long operating life, and incorporates a fluid delivery channel for placing small amounts of liquid fertilizer or other fluids in the seed furrow.

SUMMARY OF THE INVENTION

It is an object of the present invention to provide a seed tube guard that overcomes the problems and disadvantages with the various prior art devices described above.

It is a further object of the present invention to provide a seed tube guard that has a long wear life, that is inexpensive and efficient to manufacture, that provides a fluid delivery channel into the seed furrow, that prevents damage to the inner surface of the opener discs, that reduces maintenance required for the planter, that allows a furrow having a consistent width to be produced by the planter for a longer period of time for more accurate seed placement, and that has a durable mounting system for attaching to the planter shank.

To accomplish these and other objects of the invention, a seed tube guard for agricultural planters is provided which is cast from a high-chrome cast-iron alloy. The seed tube guard has an upper end, a lower body portion, and an intermediate portion.

The upper end is adapted to be attached to a planter shank assembly. A seed tube guide is attached to the intermediate portion and extends from a rear side thereof. The lower body portion has a generally horizontal bottom surface, a leading front surface, a trailing rear surface, and respective right and left wear surfaces for engaging inner surfaces of a pair of opener discs. The wear surfaces each have a generally trapezoidal shape with generally parallel front and rear edges. A fluid delivery channel is formed in the lower body portion between the right and left wear surfaces with an exit in the bottom surface for delivering fluid into a seed furrow ahead of the seed tube.

According to a broad aspect of the present invention, a seed tube guard for an agricultural planter is provided, comprising: an integral member having right and left wear surfaces for engaging inner surfaces of a pair of opener discs; and a fluid delivery channel formed in the integral member between the right and left wear surfaces, the fluid delivery channel having an exit located in a lower end of the integral member.

According to another broad aspect of the present invention, a seed tube guard for an agricultural planter is provided, comprising: an integral member having an upper end, a lower body portion, and an intermediate portion located between the upper end and the lower body portion; the upper end adapted to be attached to a planter shank assembly; the lower body portion having a generally horizontal bottom surface at a lowermost extent of the seed tube guard, a leading front surface, a trailing rear surface, and respective right and left wear surfaces for engaging inner surfaces of a pair of opener discs; and a fluid delivery channel formed in the lower body portion between the right and left wear surfaces, the fluid delivery channel having an exit located in the bottom surface for delivering fluid into a seed furrow ahead of a seed tube of the planter.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

An improved seed tube guard according to embodiments of the present invention will now be described in detail with reference to FIGS. 1 to 22 of the accompanying drawings.

Figure 1:
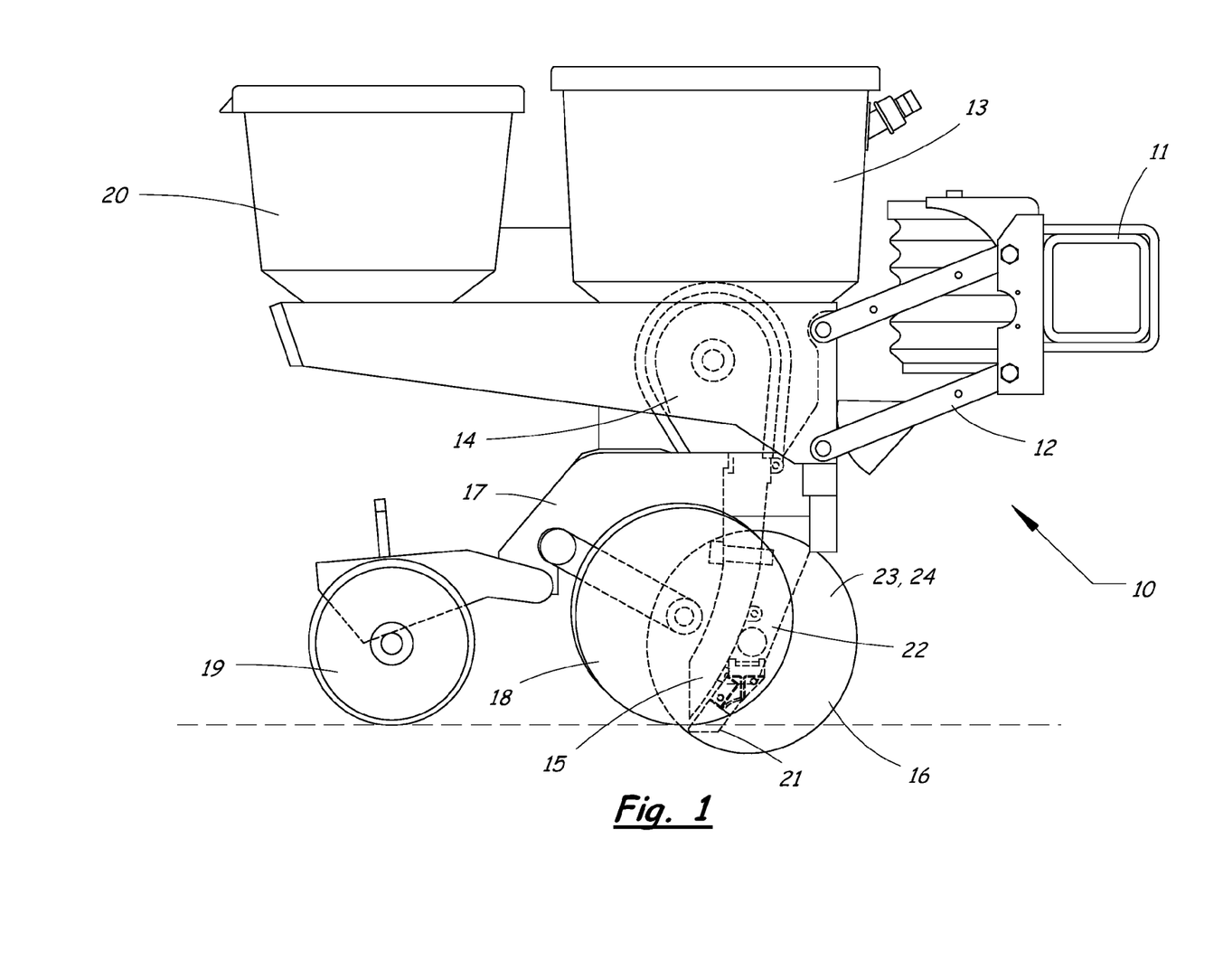
FIG. 1 is a side view of a planter row unit attached to a tool bar by a parallel linkage.

FIG. 1 illustrates a planter row unit 10 attached to a transverse tool bar 11 by a parallel linkage 12 in a conventional manner. The planter row unit 10 has a seed bin 13 that holds a supply of seed, and a seed meter 14 at the bottom of the seed bin 13 that singulates and drops seeds into a seed tube 15 for placing the seeds in a seed planting furrow. The seed planting furrow is formed by a furrow opener 16 attached to a shank 22 of a row unit subframe 17. Adjustable gauge wheels 18 attached to the subframe 17 control the depth of the furrow opener 16. A furrow closing assembly 19, such as a pair of closing wheels, follows behind the seed tube 15 and furrow opener 16 to close the furrow and thereby cover the seed with soil after the seed has been deposited. A pesticide bin 20 is also shown on the planter row unit 10 for applying pesticides, such as insecticides, during the planting operation.

Figure 2:
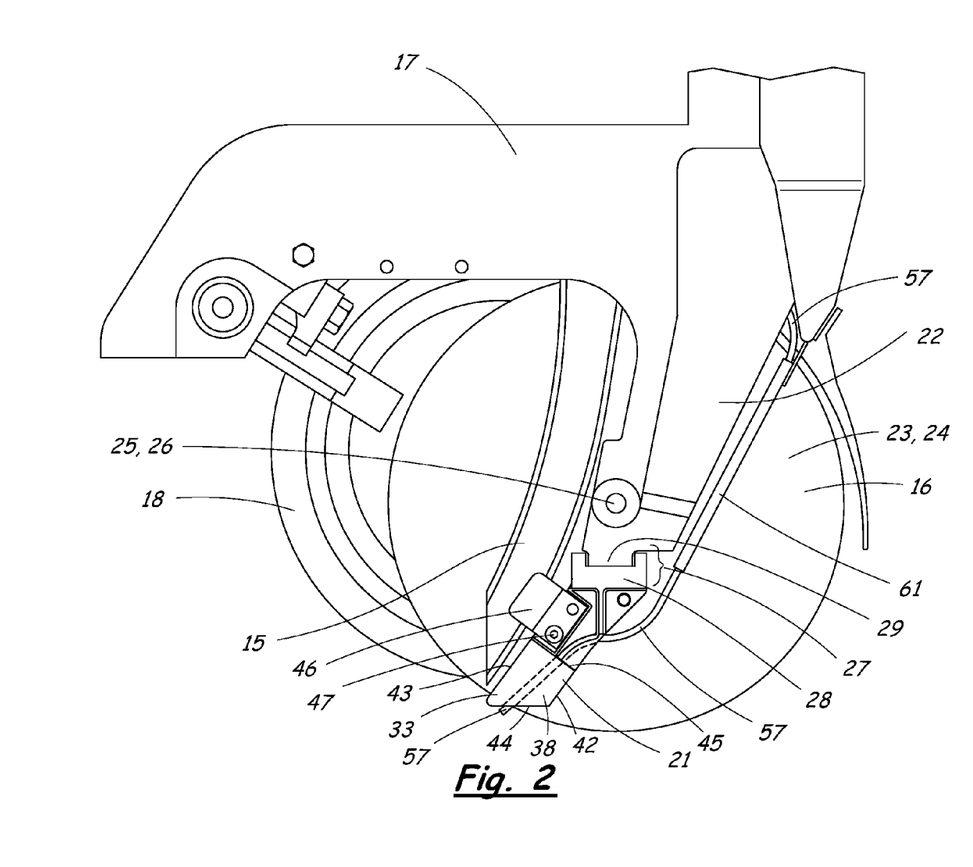
FIG. 2 is a detail view of a portion of the planter row unit with one of the furrow opener discs removed to show the seed tube and seed tube guard.
Figure 3:
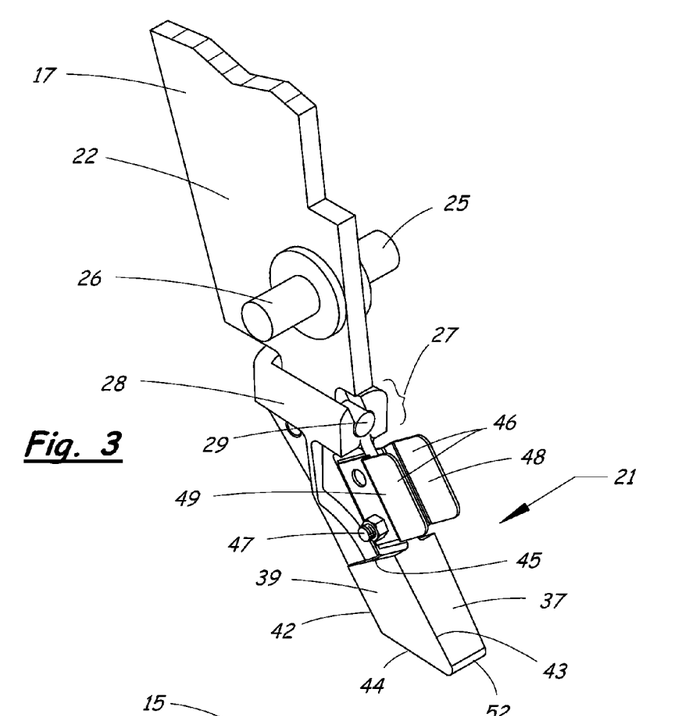
FIG. 3 is a perspective view of a seed tube guard attached to a row unit shank according to a first embodiment of the present invention.
Figure 4:
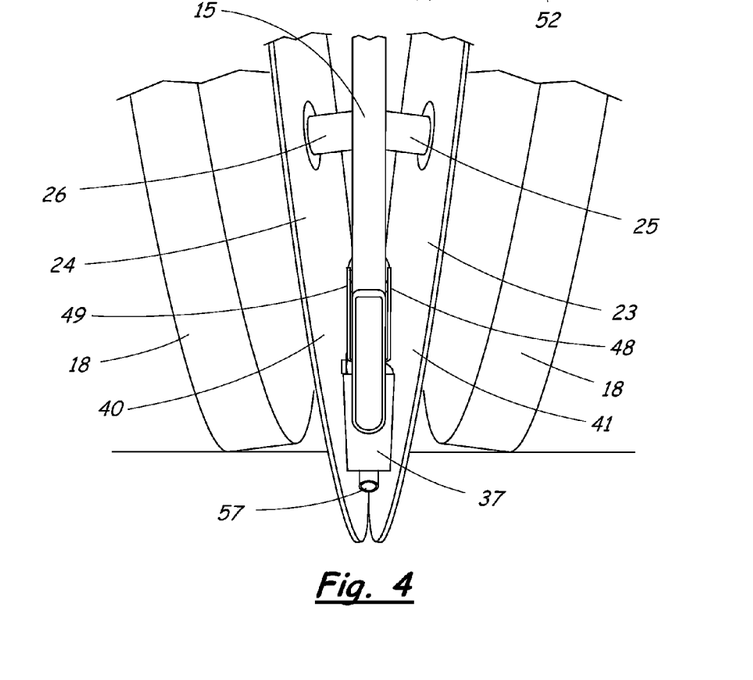
FIG. 4 is a rear view of the planter row unit showing the seed tube guard and seed tube positioned between the furrow opener discs.
Figure 5:
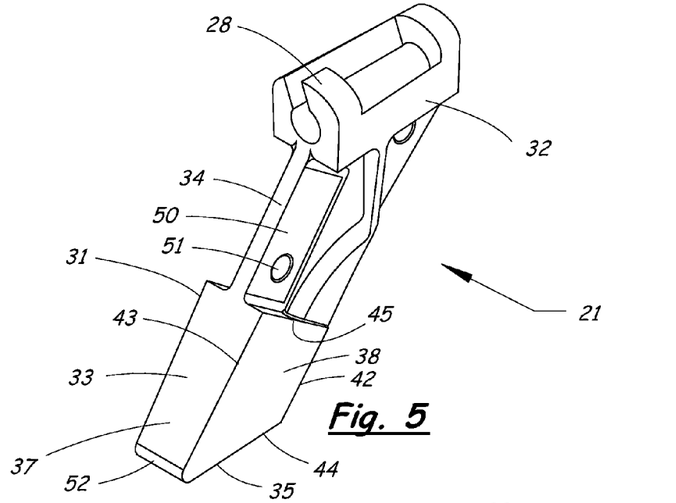
FIG. 5 is a perspective view of the seed tube guard shown in FIG. 3.
Figures 6, 7, 8, 9:
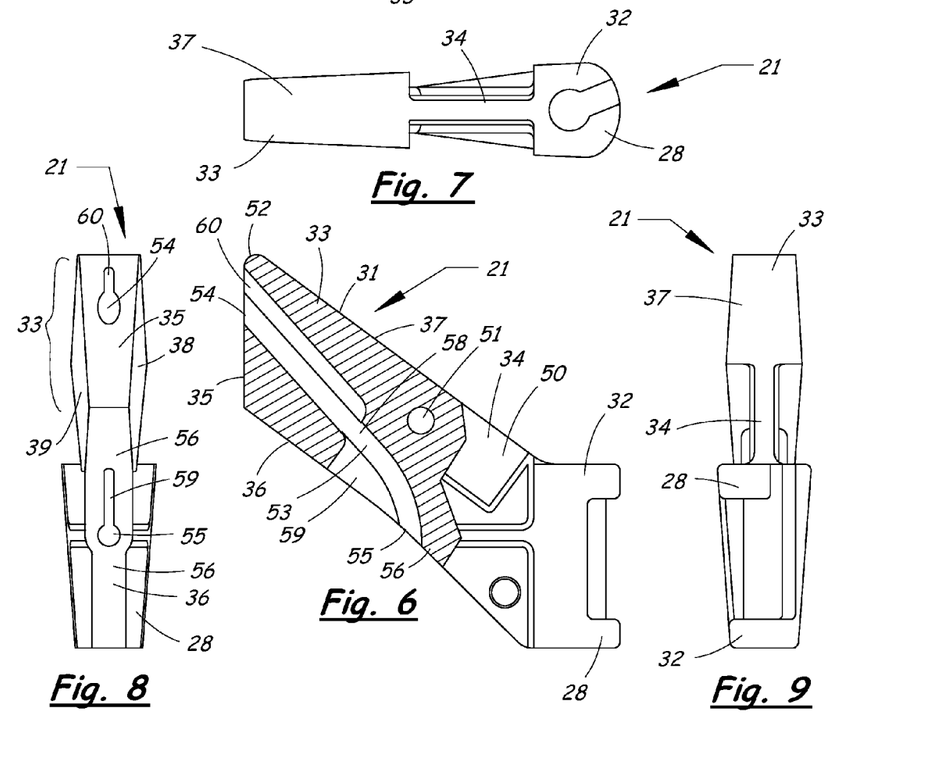
FIG. 6 is a cross section side view of the seed tube guard shown in FIG. 5.
FIG. 7 is a rear view of the seed tube guard shown in FIG. 5.
FIG. 8 is a bottom view of the seed tube guard shown in FIG. 5.
FIG. 9 is a top view of the seed tube guard shown in FIG. 5.
Figure 10:
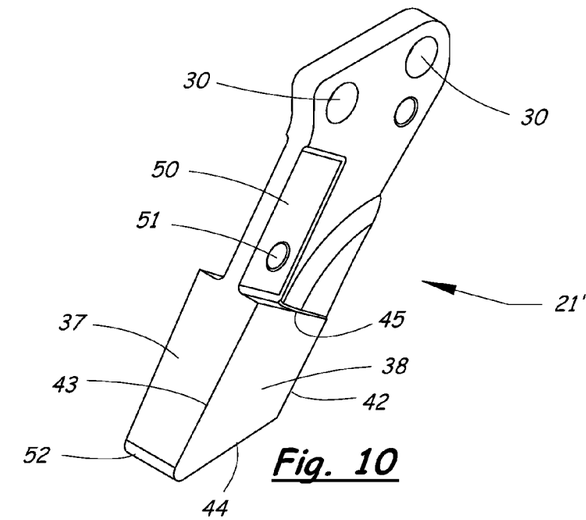
FIG. 10 is a perspective view of a seed tube guard according to a second embodiment of the present invention.
Figure 11:
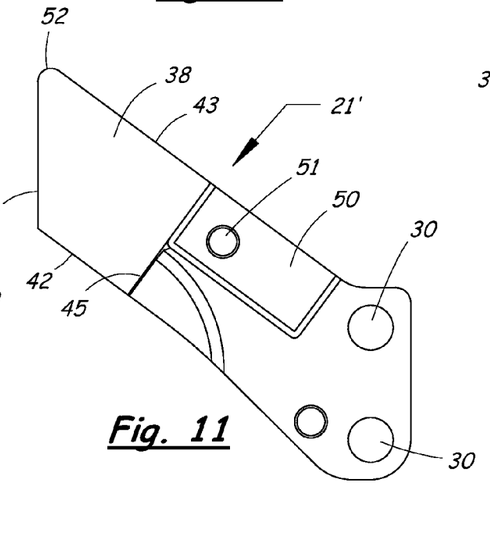
FIG. 11 is a side view of the seed tube guard shown in FIG. 10.
Figure 12:
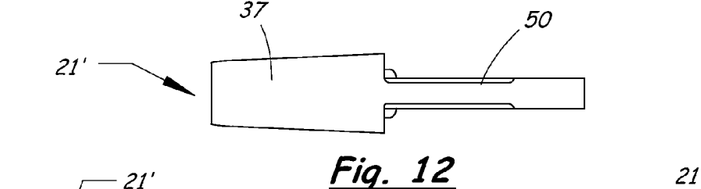
FIG. 12 is a rear view of the seed tube guard shown in FIG. 10.
Figure 13:
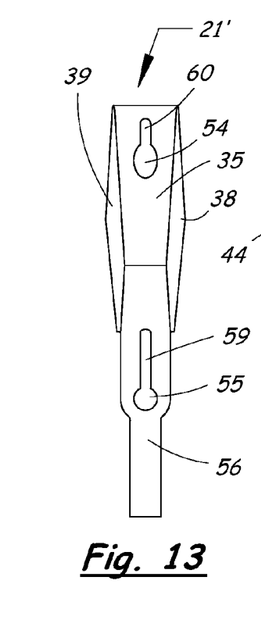
FIG. 13 is a bottom view of the seed tube guard shown in FIG. 10.
Figure 14:
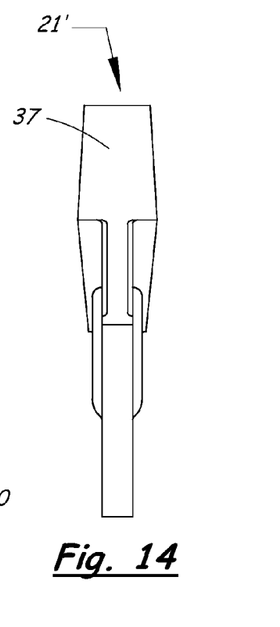
FIG. 14 is a top view of the seed tube guard shown in FIG. 10.

The seed tube guard 21 of the present invention is positioned immediately in front of the seed tube 15 for protecting the seed tube 15 from contact with the soil or with the opener discs 23, 24. The seed tube guard 21 is mounted to the planter shank 22, which is located between the two opener discs 23, 24 of the furrow opener 16. The opener discs 23, 24 are used to form the furrow for planting seeds and are rotatably mounted on respective right and left spindles 25, 26 attached to the planter shank 22 in a conventional manner. As shown in FIG. 2, a structure 27 is provided for coupling the lower end of the planter shank 22 with the seed tube guard 21 of the present invention. The coupling structure 27 used by the seed tube guards 21 of the present invention is similar to the coupling structure used to mount conventional OEM seed tube guards to the planter shank 22.

For example, in a first embodiment illustrated in FIGS. 1 to 9, the coupling structure 27 between the planter shank 22 and the seed tube guard 21 includes a twist-on style coupler 28 formed on an upper end of the seed tube guard 21 that mates with a corresponding structure 29 formed on a lower end of the planter shank. This type of twist-on style coupler is commonly used with Deere XP planter row units.

In a second embodiment illustrated in FIGS. 10 to 14, the coupling structure between the planter shank (not shown) and the seed tube guard 21' includes a pair of mounting holes 30 formed in an upper end of the seed tube guard 21'. The mounting holes 30 in the seed tube guard 21' are aligned with corresponding holes (not shown) in the lower end of the planter shank, and a pair of fasteners (not shown) are used to attach the seed tube guard 21' to the planter shank. This style coupler is commonly used with other OEM planter row units, such as older John Deere pre-XP planter units, as well as Kinze 2000- and 3000-series planters, and AGCO/White 6000- and 8000-series planters.

The seed tube guard 21, 21' of the present invention provides a substantial improvement over existing seed tube guards by increasing the wear life of the seed tube guard. The increased wear life of the seed tube guard 21, 21' is accomplished by using a high-chrome alloy material and by providing a greater wear surface on the guard itself.

The reason that wear resistance is important on the seed tube guard 21, 21' is that the seed tube guard 21, 21' serves as the back-stop to prevent blade flexure of the opener discs 23, 24. When the seed tube guard 21, 21' becomes worn, the opener disc blades 23, 24 are allowed to flex more due to soil resistance. When the opener disc blades 23, 24 flex, they tend to pinch tighter together and often make a furrow that is too narrow. As the amount of flexing changes with changing soil conditions during use, the effective depth of seeds can be highly variable if such flexing is allowed to occur. A planter that is usually very precise in loose, tilled seed beds can suddenly become very imprecise in no-till resilient soils, due simply to opener blade flex.

The seed tube guard 21 of the first embodiment illustrated in FIGS. 1 to 9 includes an integral cast member 31 having an upper end 32, a lower body portion 33, and an intermediate portion 34 located between the upper end 32 and the lower body portion 33. The upper end 32 has a twist-on style coupler 28 for attaching the seed tube guard 21 to the planter shank 22, as described above. The lower body portion 33 has a generally horizontal bottom surface 35 at a lowermost extent of the seed tube guard 21, a leading front surface 36, and a trailing rear surface 37. The leading front surface 36 has a first width, and the trailing rear surface 37 has a second width which is larger than the first width.

The lower body portion 33 also has respective right and left wear surfaces 38, 39 for engaging inner surfaces 40, 41 (see FIG. 4) of the opener discs 23, 24. The wear surfaces 38, 39 each have a generally trapezoidal shape with generally parallel front and rear edges 42, 43, a bottom edge 44, and a top edge 45. The front and rear edges 42, 43 are defined at the respective intersections between the wear surface 38, 39 and the front and rear surfaces 36, 37. The bottom edge 44 is defined at the intersection between the wear surface 38, 39 and the bottom surface 35. The wear surface 38, 39 comprises a substantially flat surface that extends between the front, rear, bottom and top edges 42-45.

A seed tube guide 46 is attached to the intermediate portion 34 of the seed tube guard 21 using a threaded fastener 47. The seed tube guide 46 (FIG. 3) includes right and left guide members 48, 49 that are placed on respective right and left sides of the intermediate portion 34 of the seed tube guard 21. The intermediate portion 34 has a shallow recess 50 formed on each side thereof for receiving the guide members 48, 49, and at least one mounting hole 51 extending therethrough for receiving the threaded fastener 47. The seed tube guide 46 functions to keep the seed tube 15 centered behind the seed tube guard 21 and to prevent the seed tube 15 from being displaced laterally and wearing against the rotating opener discs 23, 24.

The seed tube guard 21 is cast from a metal alloy having a high wear resistance to provide an extremely long wear life. For example, the metal alloy of the present invention can be a high-chrome cast-iron alloy having a chrome content of at least 20%. Other embodiments include machining the seed tube guard 21 from tooling steel and heat-treating, or making the seed tube guard 21 from additive manufacturing (also known as 3-D printing) of materials with proper attributes of wear resistance, or making the wear surfaces of super wear-resistant material, such as tungsten carbide, ceramic, or the like.

The wear surfaces 38, 39 of the seed tube guard 21 are also formed with a relatively large surface area to provide a greater wear surface for increasing the wear life of the seed tube guard 21. In a preferred embodiment, the surface area of each wear surface 38, 39 is at least three square inches. This surface area is obtained by making the wear surfaces 38, 39 extend the entire width from front to back of the lower body portion 33 of the seed tube guard 21, and by providing a trapezoidal shape that maximizes the use of the available space between the opener discs 23, 24 behind the leading edges of the opener discs 23, 24 and ahead of the seed tube 15.

For example, the wear surfaces 38, 39 can be made to have a surface area that exceeds three square inches by making the first width of the leading front surface 36 approximately 0.6 inches, the second width of the trailing surface 37 approximately 0.9 to 0.95 inches, the length of the front edge 42 approximately 1.5 inches, the length of the rear edge 43 approximately 2.6 inches, the length of the top edge 45 approximately 1.7 inches, and the length of the bottom edge 44 approximately 2.0 inches. The width of the trailing rear surface 37 can be made slightly wider at the top than at the bottom to accommodate a camber of the opener discs 23, 24. A rounded lower rear corner 52 is provided at the intersection of the bottom surface 35 and the rear surface 37.

For supporting the furrow opener discs 23, 24 to the best advantage, the wear surfaces 38, 39 should be located immediately adjacent to and in front of the seed tube 15, and as low as practicable without having the lower edge 44 of the seed tube guard 21 extend below the furrow opener discs 23, 24. The lower edge 44 of the guard should not extend below the furrow opener discs 23, 24 because this would result in extreme smearing of the soil, which is agronomically undesirable, especially in damp soils and/or no-till. The wear surfaces 38, 39 should be positioned such that they avoid mud accumulation and allow for loss of diameter of the furrow opener discs 23, 24 as they wear.

A fluid delivery channel 53 is formed in the seed tube guard 21 between the right and left wear surfaces 38, 39. The fluid delivery channel 53 has an exit 54 located in the bottom surface 35 of the lower body portion 33. The fluid delivery channel 53 extends in an arcuate path through the cast member 31 with an entrance 55 located in a leading surface 56 of the intermediate portion 34 of the seed tube guard 21. The fluid delivery channel 53 curves along its length so that it is sloped downwardly and rearwardly at a steeper angle at its exit 54 than at its entrance 55 into the seed tube guard 21. For example, the fluid delivery channel 53 can be approximately 45 degrees from vertical at its exit 54, and approximately horizontal at its entrance 55. The fluid delivery channel 53 is dimensioned to receive a plastic tube 57 (e.g., 0.25-inch outside diameter plastic tubing) for delivering fluids, such as low rates of seed-safe fertilizers, inoculants, fungicides, and plant growth promoters, into the seed furrow ahead of the seed tube 15.

By locating the fluid delivery channel 53 within the body of the seed tube guard 21, the wear surfaces 38, 39 can be larger because it is not necessary to leave a space in front of or behind the seed tube guard 21 to locate the fluid delivery tube 57. Also, by making the fluid delivery channel 53 in an arcuate path with the entrance 55 at the upper front side of the seed tube guard 21, the fluid delivery tube 57 can be conveniently routed around the coupling 27 between the seed tube guide 46 and the planter shank assembly 22 without interfering with the seed tube guard 21 or running into other space constraints.

The fluid delivery channel 53 includes a central channel 58 which is substantially circular in cross section, a first groove 59 extending forward from an upper portion of the central channel 58 to the leading surface 56 of the intermediate portion 34, and a second groove 60 extending downwardly and rearwardly from a lower portion of the central channel 58 to the bottom surface 35. The first and second grooves 59, 60 make it more feasible to cast a small central channel (e.g., approximately 0.30 inch diameter) through the seed tube guard 21. This is because the core (not shown) that creates the small central channel 58 is easily destroyed by the weight of the molten metal, but the vanes on the core used to create the first and second grooves 59, 60 provide enough additional stability to overcome such destruction of the core. The first and second grooves 59, 60 also ease the passage of the plastic tube 57 through the seed tube guard 21 as the plastic tube 57 deforms slightly to pass around the bend of the central channel 58. The first and second grooves 59, 60 will also make clean-out of the curved central channel 58 easier in case dirt or corrosion or a piece of plastic tubing becomes lodged in the channel 58.

The plastic tube 57 can also be protected by routing the tube 57 inside a stainless-steel tube holder 61 on the front side of the planter row unit 10 to prevent the tube 57 from abrading on inner surfaces 40, 41 of opener discs 23, 24, which can eventually wear a hole in the plastic tube 57 and result in the undesirable outcome of fluid leakage on the inner surfaces 40, 41, as well as onto the seed tube 15. The holder 61 also affords some protection of the plastic tube 57 against corn stalks, and so forth, as the plastic tube 57 routes into or alongside the shank 22 above the opener discs 23, 24.

The seed tube guard 21' of the second embodiment has a different coupling structure for attaching the seed tube guard 21' to the planter shank, as explained above. However, the other features of the seed tube guard 21' of the second embodiment are the same as those of the seed tube guard 21 of the first embodiment. Accordingly, the reference numerals used to denote the various features of the seed tube guard 21 of the first embodiment (FIGS. 1 to 9), have been used to denote the same features of the seed tube guard 21' of the second embodiment (FIGS. 10 to 14), and further explanation of these features has been omitted.

Figure 15:
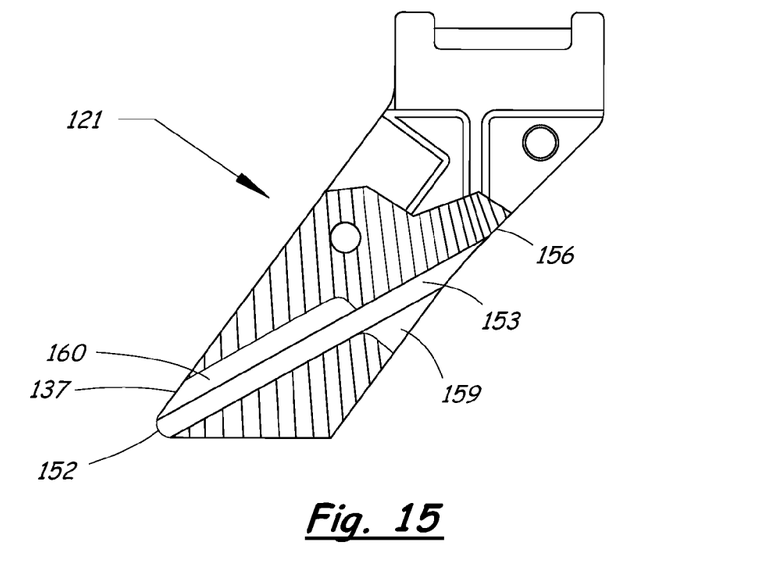
FIG. 15 is a cross section side view of a seed tube guard according to another embodiment of the present invention.

A seed tube guard 121 according to another embodiment of the present invention is illustrated in FIG. 15. The seed tube guard 121 has a fluid delivery channel 153 that extends in a substantially straight line downwardly and rearwardly from a leading front surface 156 to the lower rear corner 152 of the guard 121. The fluid delivery channel 153 has an exit located partly in the lower rear surface 137 for delivering fluid into the seed furrow ahead of the seed tube of the planter. First and second grooves 159, 160 are provided to facilitate casting the channel 153 and to ease the passage of a plastic tube through the seed tube guard 121.

Figure 16:
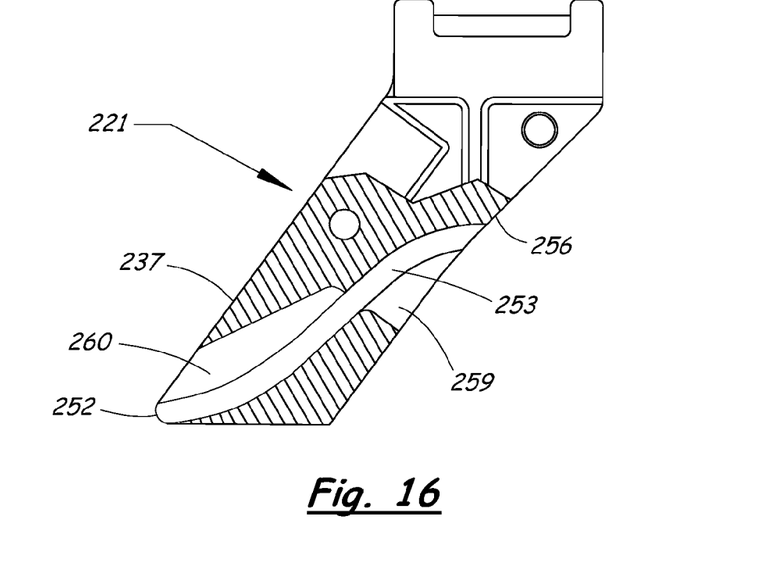
FIG. 16 is a cross section side view of a seed tube guard according to another embodiment of the present invention.

A seed tube guard 221 according to another embodiment of the present invention is illustrated in FIG. 16. The seed tube guard 221 has a fluid delivery channel 253 that extends in a double curve from a leading front surface 256 to the lower rear corner 252 of the guard 221. The fluid delivery channel 253 has an exit located partly in the lower rear surface 237 for delivering fluid into the seed furrow ahead of the seed tube of the planter. First and second grooves 259, 260 are provided to facilitate casting the channel 253 and to ease the passage of a plastic tube through the seed tube guard 221.

Figure 17:
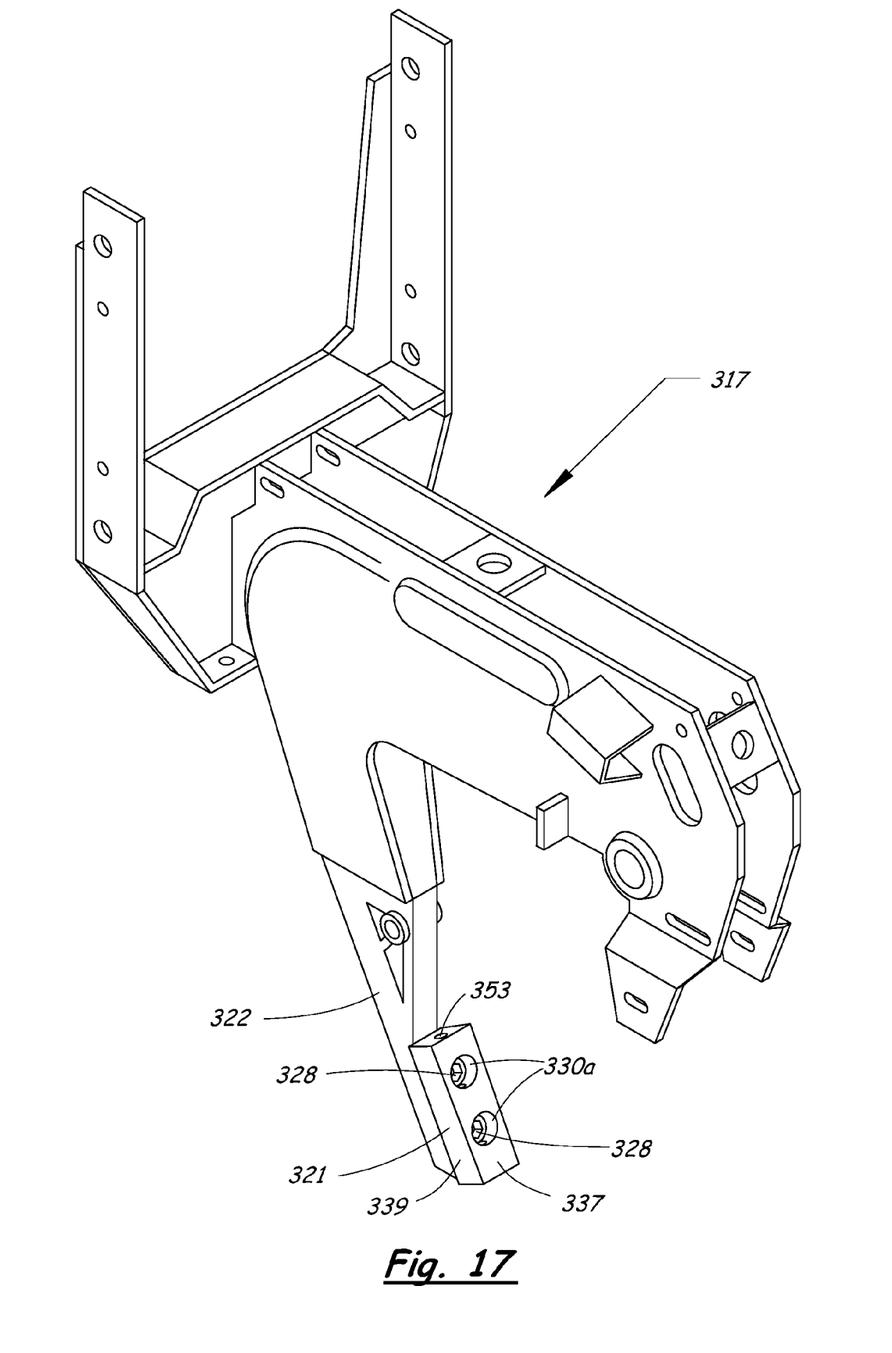
FIG. 17 is a perspective view of a planter row unit subframe having a seed tube guard according to another embodiment of the present invention.

A seed tube guard 321 according to another embodiment of the present invention is illustrated in FIGS. 17 to 22. The seed tube guard 321 is designed for use with a planter row unit known in the industry as the Kinze 3000-series row unit. The subframe 317 of the row unit is shown in FIG. 17 with the seed tube guard 321 attached to the lower end of the shank portion 322. The seed tube guard 321 is attached to the shank portion 322 using a pair of threaded fasteners 328 that extend through counterbore mounting holes 330 in the seed tube guard 321. For example, the threaded fasteners 328 can be socket screws that have their heads received into the counterbore portion 330a of the mounting holes 330. The seed tube guard 321 is shown in more detail in FIGS. 18 to 22.

Figures 18, 19:
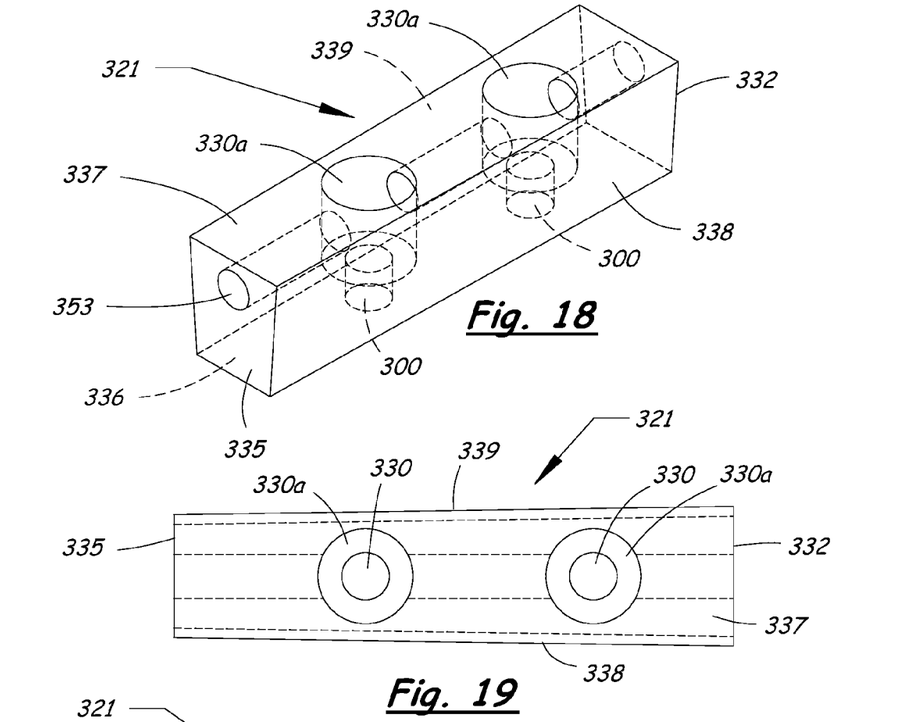
FIG. 18 is a perspective view of the seed tube guard shown in FIG. 17.
FIG. 19 is a plan view of the seed tube guard shown in FIG. 17.
Figure 21:
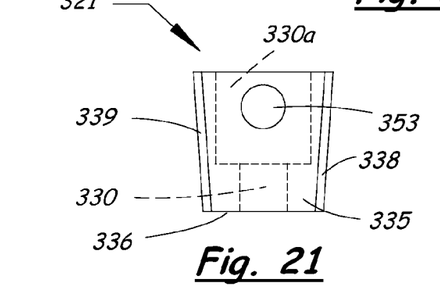
FIG. 21 is a bottom end view of the seed tube guard shown in FIG. 17.
Figure 22:
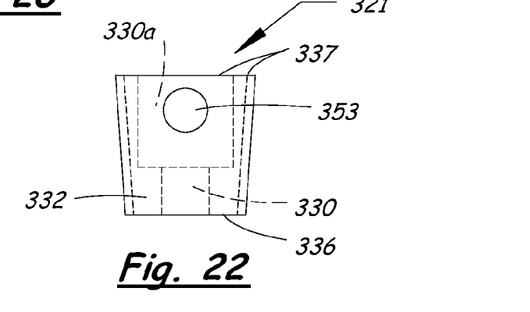
FIG. 22 is a top end view of the seed tube guard shown in FIG. 17.

The seed tube guard 321 has trapezoidal-shaped front and rear surfaces 336, 337 as shown in FIGS. 18 and 19, and trapezoidal-shaped top and bottom surfaces 332, 335 as shown in FIGS. 21 and 22. The rear surface 337 is slightly wider at the top than at the bottom to accommodate a camber of the opener discs. The seed tube guard 321 also has right and left wear surfaces 338, 339, which are generally rectangular in shape. The wear surfaces 338, 339 are arranged to be contacted by the furrow opener discs (not shown in FIG. 17), as in the other embodiments described above.

Figure 20:
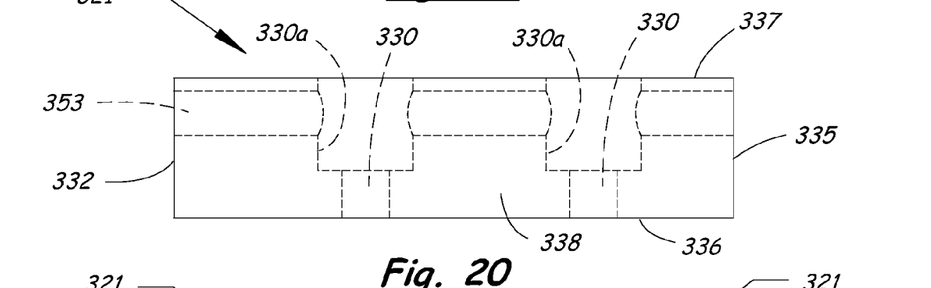
FIG. 20 is an elevation view of the seed tube guard shown in FIG. 17.

The seed tube guard 321 has a fluid delivery channel 353 that extends in a substantially straight line downwardly and rearwardly from a top end of the seed tube guard 321 to the bottom end 335 of the guard 321. The fluid delivery channel 353 has an exit located in the bottom end 335 of the seed tube guard 321 for delivering fluid into the seed furrow ahead of the seed tube of the planter. The fluid delivery channel 353 can be bored through the body of the seed tube guard 321, as illustrated in FIGS. 18 to 20.

Although the present invention has been illustrated and described as being mounted to a row crop planter unit 10, it can also be mounted to other seeding equipment, such as grain drills and the like. Accordingly, it should be understood that the invention is not limited to the row crop planter illustrated herein.

While the invention has been specifically described in connection with specific embodiments thereof, it is to be understood that this is by way of illustration and not of limitation, and the scope of the appended claims should be construed as broadly as the prior art will permit.

What is claimed is:

1. In an agricultural planter having a pair of opener discs for forming a furrow and a seed tube for placing seeds in the furrow, a seed tube guard comprising:
    an integral member positioned in front of the seed tube, said integral member having right and left wear surfaces for engaging inner surfaces of the pair of opener discs, and a trailing rear surface positioned in front of a leading side of the seed tube; and
    a fluid delivery channel formed within said integral member in front of said trailing rear surface and between said right and left wear surfaces, said fluid delivery channel having an exit located in a lower end of said integral member.

2. The agricultural planter according to claim 1, wherein said integral member has an upper end, a lower body portion, and an intermediate portion located between said upper end and said lower body portion;
    said upper end is adapted to be attached to a planter shank assembly;
    said lower body portion has a bottom surface at a lowermost extent of said seed tube guard, a leading front surface having a first width, and a trailing rear surface having a second width; and
    said wear surfaces are provided on said lower body portion, each wear surface comprising a substantially flat surface having a leading edge located in front of said fluid delivery channel and a trailing edge located behind said fluid delivery channel and immediately in front of the leading side of the seed tube.

3. The agricultural planter according to claim 2, further comprising a seed tube guide attached to said intermediate portion and extending from a rear side thereof for centering the seed tube behind the seed tube guard between the pair of opener discs.

4. The agricultural planter according to claim 2, further comprising a rounded lower rear corner at an intersection of said bottom surface and said rear surface.

5. The seed tube guard according to claim 2, wherein said upper end comprises a pair of mounting holes for attaching the seed tube guard to a planter shank assembly using a pair of fasteners.

6. The agricultural planter according to claim 2, wherein said upper end comprises a twist-on style coupler that mates with a corresponding structure formed on a lower end of said planter shank assembly.

7. The agricultural planter according to claim 1, wherein said integral member is cast from a metal alloy.

8. The agricultural planter according to claim 7, wherein said metal alloy comprises a chrome cast-iron alloy having at least 20% chrome content.

9. The agricultural planter according to claim 1, wherein said integral member has an upper end, a lower body portion, and an intermediate portion located between said upper end and said lower body portion;
    said upper end is adapted to be attached to a planter shank assembly;
    said lower body portion has a bottom surface at a lowermost extent of said seed tube guard, a leading front surface having a first width, and a trailing rear surface having a second width; and
    said first width of the leading front surface is smaller than said second width of the trailing rear surface.

10. The agricultural planter according to claim 9, wherein said trailing rear surface has a top and a bottom and is wider at the top than at the bottom to accommodate a camber of the opener discs.

11. The agricultural planter according to claim 1, wherein said fluid delivery channel extends in an arc through said integral member.

12. The agricultural planter according to claim 11, wherein said fluid delivery channel has an entrance and a length extending between said entrance and said exit, and said fluid delivery channel curves along said length so that said fluid delivery channel is sloped downwardly and rearwardly at a steeper angle at said exit than at said entrance.

13. The seed tube guard according to claim 1, wherein said fluid delivery channel has an S-curve along its length.

14. The seed tube guard according to claim 1, wherein said fluid delivery channel extends substantially straight through said integral member.

15. The agricultural planter according to claim 1, wherein said fluid delivery channel has an entrance located in an upper end of said integral member.

16. The agricultural planter according to claim 1, wherein said fluid delivery channel comprises a central channel which is substantially circular in cross section, and a groove extending from said central channel to an outer surface of said integral member.

17. The agricultural planter according to claim 1, wherein said fluid delivery channel has a plastic line extending therethrough for delivering fluids into a seed furrow.

18. In an agricultural planter having a pair of opener discs for forming a furrow and a seed tube for placing seeds in the furrow, a seed tube guard comprising:
an integral member positioned in front of the seed tube, said integral member having an upper end, a lower body portion, and an intermediate portion located between said upper end and said lower body portion;
said upper end adapted to be attached to a planter shank assembly;
said lower body portion having a bottom surface at a lowermost extent of said seed tube guard, a leading front surface, a trailing rear surface positioned in front of a leading side of the seed tube, and respective right and left wear surfaces for engaging inner surfaces of a pair of opener discs; and
a fluid delivery channel formed within said lower body portion in front of said trailing rear surface between said right and left wear surfaces.

19. The agricultural planter according to claim 18, wherein said fluid delivery channel has an exit located in said bottom surface for delivering fluid into the furrow ahead of the seed tube.

20. The agricultural planter according to claim 18, wherein said fluid delivery channel extends in an arcuate path through said integral member with an entrance located in a leading front surface of said intermediate portion.

21. The agricultural planter according to claim 18, wherein said fluid delivery channel comprises a central channel which is substantially circular in cross section, a first groove extending forward from an upper portion of said central channel to said leading surface of said intermediate portion, and a second groove extending downwardly and rearwardly from a lower portion of said central channel to said bottom surface.

22. The seed tube guard according to claim 18, wherein said fluid delivery channel has an exit located in the lower rear surface for delivering fluid into a seed furrow ahead of a seed tube of the planter.

\* \* \* \* \*